Dec. 22, 1959  J. E. ARCHER  2,917,774
MODELING METHOD AND MEANS
Filed July 14, 1958

INVENTOR.
JOHN E. ARCHER
BY C. E. Stratton
ATTORNEY

United States Patent Office 2,917,774
Patented Dec. 22, 1959

2,917,774

MODELING METHOD AND MEANS

John E. Archer, Los Angeles, Calif.

Application July 14, 1958, Serial No. 748,229

8 Claims. (Cl. 18—5.1)

This invention relates to a method for modeling additions to or increases on elements or members such as eyeglass temples, bridges, and the like.

Regardless how carefully skull-engaging or -gripping temples or earpieces are fitted, they soon lose their original grip due, in a large measure, to form changes of the temples as caused by body heat. Since members such as earpieces do not ordinarily conform to the formations of the skull where the same grip the skull but, rather, have line or point contact with the high portions of the skull, such loosening can result only in a downward and forward displacement of the eyeglasses due to such loss of grip.

The present invention has for an object to provide a simple method for so reforming eyeglass temples that the same intimately follow and fit not only the high points of the skull but also the slight hollows and curvatures thereof, thereby insuring a good temple fit even in cases where the temples have slacked off somewhat. In other words, the fit between temple and skull is made on an intimately personal basis—a fit that could not otherwise be had regardless how carefully the temples are bent to cause maximum skull grip.

Another object of the invention is to provide a temple-modeling method in which ordinary commercial temples are connected into personalized temples while in engagement with the skull.

A further object of the invention is to provide a novel mold that may be inexpensively applied where modeling changes or increases are indicated, the same being dispensible after use.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Figure 3:
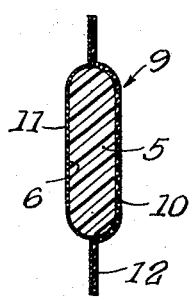
Figure 4:
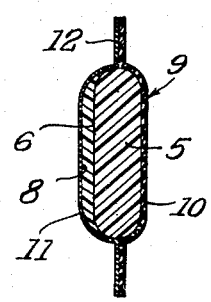

Figs. 3 and 4 are enlarged cross-sectional views as taken on the lines 2—2 and 3—3, respectively.

Figure 1:
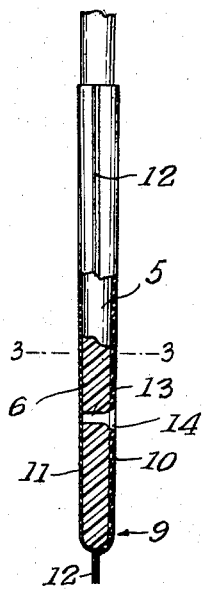
Fig. 1 is a broken and longitudinal sectional view of a temple provided with a mold according to the present invention.
Figure 2:
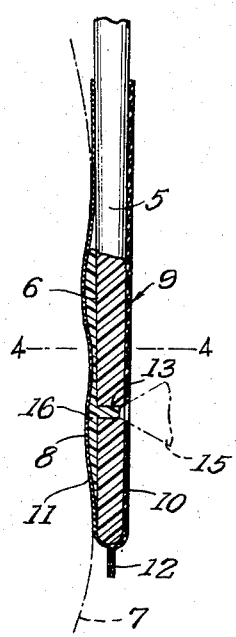
Fig. 2 is a similar view showing how the temple has been changed in form where the same grips a skull to conform to the high and low spots of the skull.

The conventional plastic or composition skull-gripping end 5 of a temple is shown in Fig. 1. While shown straight, the same may be flatly curved, as is usually the case. In any case, the temple end 5 has a skull-gripping face 6 that is either entirely straight or so curved that the same can grip only the high points of a skull. It will be clear that when such a temple end is fitted to a skull 7 (see Fig. 2), only points thereof achieve contact with the skull, and that the same easily becomes loosened, resulting in undesired displacement of the eyeglasses.

In order to provide for improved fit of the temple, the same is changed, where the surface 6 engages the skull, to have a new skull-engaging surface 8 that is intimate to the undulations of the skull 7 and, therefore, efficiently grips the same.

It is to be assumed that the member 5, its initial surface 6, and its altered form-fitting surface 8, may be parts of a nosepiece pad or nosepiece and the following method carried out in connection with such items.

After a temple end 5 has been generally conformed to the skull to bring the surface 6 into the optimum engaging fit with said skull, the same is removed from the skull and a mold 9 fitted therearound. Such mold may be placed in position in advance of general fitting, if desired. Said mold comprises a piece of pressure-sensitive tape or court plaster 10 and a similarly-shaped piece of thin, highly stretchable latex or rubber 11. These two pieces of sheet material are applied to the temple end to enclose the same, the tape or plaster 10 on the outside and the latex or rubber covering the inner face 6. Since the sheet 10 has a tacky, rubber cement-covered face, said face is adhered to the temple end. Inasmuch as latex or rubber will cohere to such a rubber-covered face, the sheets 10 and 11 are provided with marginal portions, that adhere at 12, around the outside of the temple end.

The sheet 11 does not adhere to the surface 6. Consequently, because of the easy stretchability of sheet 11, the same can be ballooned out of contact with surface 6 while the adhered sheet 10 holds the above-described mold in place.

In practice, the temple end is provided with a sprue 13 and with a registering hole 14 in the sheet 10. Said sprue leads to the mold cavity that is formed when the sheet 11 is stretched. Since the rubber sheet 11 is of diaphanous thickness, its interposition between the temple end and the skull is quite immaterial to the fit before said end is provided with the new form-fitting temple surface 8.

With the mold-provided temple end in place against the skull of the person being fitted, a cold plastic material is inserted through the sprue 13, as by a syringe 15 or comparable device. Any conventional cold-curing and automatically-polymerizing material may be so injected to cause distention of sheet 11 as permitted by the undulations of the skull 7. Such a material may comprise an auto-polymerizing polymer admixed with an auto-polymerizing monomer, the admixture preferably taking place in the syringe 15 to insure against premature curing or setting. In any case, the cold-cure material 16 becomes fused and/or adhered to the temple end 5 and, therefore, an integral part thereof. Thus, the temple end is changed to one that has a skull-engaging surface 8 that produces the advantages above referred to.

It is a simple matter to strip away the mold sheets 10 and 11, after the material 16 has become cured, leaving the improved temple end as above described.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what I claim and desire to secure by Letters Patent is:

1. A method of modeling a member to a skull that consists in providing a member with a mold that has a stretchable side engaged with a face of said member, and, while the member is in position with said stretchable side against the skull, introducing a cold-curing and self-polymerizing material between said stretchable side and the mentioned face to stretch and conform the stretchable side to the skull and, accordingly, thicken the member.

2. A modeling method according to claim 1 in which the mold is adhesively affixed to the member before the introduction of said material.

3. A modeling method that consists in providing a member against one face thereof, with a pliable pressure-sensitive sheet, applying a stretchable sheet against the opposite face of the member to form a stretchable side element and adhesively connecting the margins of said sheets to form a mold for enclosing the member, and, while the mold is in position with said stretchable sheet against the skull, introducing a cold-curing and self-polymerizing material between said stretchable sheet and the mentioned face to stretch and conform the stretchable sheet to the skull and, accordingly, thicken the member.

4. A modeling mold comprising a pressure-sensitive sheet element adapted to be applied to a face of a member the opposite face of which is adapted to be modeled, and a thin, stretchable sheet element covering said opposite face and adhesively edge connected to the pressure-sensitive sheet for forming a mold cavity adapted to receive a moldable substance between said opposite face and said stretchable sheet.

5. A modeling mold according to claim 4 in which the pressure-sensitive sheet is adhesively connected to the first-mentioned face of the member.

6. A modeling mold according to claim 5 in which said pressure-sensitive sheet is rubber cement-coated on the side engaged with the member and in which the stretchable sheet is made of rubber whereby the marginal edges of both sheets adhere when pressed together to enclose the member to be modeled.

7. A modeling mold according to claim 6 in which a sprue is provided in both the member and the pressure-sensitive sheet, the same entering the space between the stretchable sheet and said member.

8. A member conformable in surface configuration to irregularities in a surface against which the member is to be carried, comprising a relatively rigid structural unit, a pressure sensitive sheet element adapted to be applied to a face of the unit, the opposite face of which is to conform to surface irregularities of a surface to which the element is to be applied, a thin stretchable sheet element covering said opposite face and adhesively connected to the pressure sensitive sheet to form a mold cavity between said face and said stretchable sheet element, and a cold-curing self-polymerizing material disposed between said opposite face and said stretchable sheet and cohered to said face to allow for conformation of the outer face of said material to such surface irregularities.

References Cited in the file of this patent

UNITED STATES PATENTS

| | | |
|---|---|---|
| 1,044,171 | Guilford | Nov. 12, 1912 |
| 2,092,910 | Daniels | Sept. 13, 1937 |
| 2,121,718 | Sweetland | June 21, 1938 |